United States Patent [19]

Eller et al.

[11] Patent Number: 4,783,322

[45] Date of Patent: Nov. 8, 1988

[54] METHOD FOR FLUORINATION OF ACTINIDE FLUORIDES AND OXYFLUORIDES THEREOF USING $O_2F_2$

[75] Inventors: Phillip G. Eller, Los Alamos, N. Mex.; John G. Malm, Naperville, Ill.; Robert A. Penneman, Albuquerque, N. Mex.

[73] Assignee: The United States of America as represented by the United States Department of Energy, Washington, D.C.

[21] Appl. No.: 636,656

[22] Filed: Aug. 1, 1984

[51] Int. Cl.[4] .................... C01G 43/06; C01G 56/00
[52] U.S. Cl. ................................ 423/19; 252/626; 423/251; 423/258
[58] Field of Search ............... 423/19, 251, 258; 252/626

[56] References Cited

U.S. PATENT DOCUMENTS

| | | | |
|---|---|---|---|
| 2,893,826 | 7/1959 | Malm et al. | 423/251 |
| 3,383,183 | 5/1968 | Grant | 423/19 |
| 4,038,374 | 7/1977 | Christe | 149/1 |
| 4,172,114 | 10/1979 | Tsujino et al. | 423/251 |
| 4,193,261 | 3/1980 | English | 149/1 |
| 4,421,727 | 12/1983 | Wilson et al. | 423/19 |
| 4,522,794 | 6/1985 | Hochel et al. | 423/251 |

OTHER PUBLICATIONS

Cleveland, *The Chemistry of Plutonium*, pp. 339–349, Gordon and Breach Science Publ. (1970) New York.
Bailar et al., *Comprehensive Inorganic Chemistry*, 2, pp. 747 and 752–756, Pergamon Press (1973) Oxford.

*Primary Examiner*—Edward A. Miller
*Attorney, Agent, or Firm*—Samuel M. Freund; Paul D. Gaetjens; Judson R. Hightower

[57] ABSTRACT

Method for fluorination of actinides and fluorides and oxyfluorides thereof using $O_2F_2$ which generates actinide hexafluorides, and for removal of actinides and compounds thereof from surfaces upon which they appear as unwanted deposits. The fluorinating agent $O_2F_2$, has been observed to readily perform the above-described tasks at sufficiently low temperatures that there is virtually no damage to the containment vessels. Moreover, the resulting actinide hexafluorides are thereby not destroyed by high temperature reactions with the walls of the reaction vessel. Dioxygen difluoride is easily prepared, stored and transferred to the desired place of reaction.

10 Claims, No Drawings

METHOD FOR FLUORINATION OF ACTINIDE FLUORIDES AND OXYFLUORIDES THEREOF USING O₂F₂

This invention is the result of a contract with the Department of Energy (Contract No. W-7405-ENG-36).

BACKGROUND OF THE INVENTION

The present invention relates generally to methods of fluorination and more particularly to the use of $O_2F_2$ for the preparation of actinide hexafluorides, and for the extraction of deposited actinides and fluorides and oxyfluorides thereof from reaction vessels.

Fluorinating agents useful for removing deposited actinide metal and compounds thereof from surfaces, and for preparing volatile actinide hexafluorides from their very stable solid tetrafluorides, oxyfluorides and pentafluorides are known. However, the difficulty with all of the known materials which are capable of performing these tasks is that little reaction takes place at or below room temperature. The requisite high temperatures (typically in excess of 300 C.) and harsh oxidizing environments result in the deterioration of any containment vessels and transfer equipment as well as in the destruction of the articles to be cleaned and the intended end products, the actinide hexafluorides themselves. Moreover, the reaction of the fluorinating agents with every warm surface in their pathway has made it very difficult to introduce the fluorinating agent into regions of interest. Atomic fluorine, a preferred fluorinating agent for the above-described tasks, is usually generated by microwave radiation, but the overall fluorination process is very inefficient.

Dioxygen difluoride was first prepared and isolated in 1933. A careful investigation of the properties of this material was performed by A. G. Streng in and presented his article entitled "The Oxygen Fluorides" published in Chem. Rev. 63, 607 (1963), the disclosure therein hereby being incorporated by reference herein. Of particular interest in this article is the mention by the author of the explosive reaction of $O_2F_2$ when placed in contact with a sheet of platinum covered with platinum fluoride at 160 K. Even at this low temperature, it would appear that $O_2F_2$ is unstable in the presence of metallic surfaces. The use of $O_2F_2$ for removing actinides and/or actinide containing compounds from metal surfaces would then be impossible especially if the $O_2F_2$ had to be introduced into the region of interest through metallic plumbing.

SUMMARY OF THE INVENTION

One object of the subject invention is to provide a method for preparing actinide hexafluorides from their respective tetrafluorides, pentafluorides and/or oxyfluorides.

Another object of our invention is to provide a method for removing actinides and/or actinide containing compounds from metallic surfaces.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the method of this invention includes contacting surfaces from which actinides or actinide-bearing compounds are to be removed in the form of their respective hexafluorides or contacting actinide fluorides and/or oxyfluorides from which the respective hexafluorides are to be prepared, with $O_2F_2$ for a time period sufficient to obtain substantial reaction between the surfaces from which actinides or actinide-bearing compounds are to be removed, or the actinide fluorides and/or oxyfluorides, removing the products of the reaction from the reaction region, and separating and collecting the actinide hexafluorides produced. Preferably, the fluorination step is performed at temperatures below approximately 25° C. Preferably also, the fluorination step is performed in the temperature range between about −80° and 25° C. It is also preferred that the $O_2F_2$ be flowed in the fluorination step.

In a further aspect of the present invention, in accordance with its objects and purposes, the method hereof includes contacting the surfaces from which actinides or actinide-bearing compounds are to be removed, in the form of their respective hexafluorides, or contacting actinide fluorides and/or oxyfluorides from which the respective hexafluorides are to be prepared, with a fluorinating agent which consists essentially of $O_2F_2$ for a time period sufficient to obtain substantial reaction between the surfaces from which actinides or actinide-bearing compounds are to be removed, or the actinide fluorides and/or oxyfluorides, removing the products of the reaction from the reaction region, and separating and collecting the actinide hexafluorides produced. Preferably, the fluorination step is performed at temperatures below approximately 20 C. Preferably also, the fluorination step is performed in the temperature range between about −80° and 25° C. It is also preferred that the $O_2F_2$ be flowed in the fluorination step.

The subject invention, then, is a method for generating actinide hexafluorides from non-volatile actinide fluorides and/or oxyfluorides, and for removing actinides and actinide-bearing compounds from surfaces, utilizing the exceptional fluorinating properties of $O_2F_2$. Such fluorinations can be achieved at low temperatures which simultaneously improves the efficiency of the fluorination, avoids the destruction of the containment vessels and avoids the destruction of the actinide hexafluorides formed as a result of the fluorination process and which are the desired products to be recovered.

DETAILED DESCRIPTION OF THE INVENTION

Reference will now be made in detail to the present preferred embodiments of the invention, which are illustrated in the accompanying examples.

EXAMPLE 1

Reaction of $O_2F_2$ with photochemically deposited $PuF_4$: About 0.33 mmol (156 mg) of gaseous $PuF_6$ was transferred into a dry quartz U-tube and irradiated using a 450 W Hg ultraviolet lamp for 20 minutes. Approximately 110 mg of the $PuF_6$ was decomposed to form 98 mg (0.31 mmol) of $PuF_4$ which deposited uniformly on the walls of the U-tube as a white coating. The $PuF_6$ that had not photolyzed was removed.

About 3.7 mmol of $O_2F_2$ was cryogenically transferred into the U-tube containing the $PuF_4$ through a 12 in. long stainless steel bellows using liquid nitrogen, and the tube warmed to approximately 25° C. After several minutes, the condensable gas products were collected. The $PuF_6$ formed was collected at $-78°$ C. and pressure measurements showed that about 90% of the $PuF_4$ had reacted to form 99 mg of $PuF_6$. All visible evidence of solids on the walls of the U-tube had disappeared.

EXAMPLE 2

Reaction of $O_2F_2$ with $PuO_2F_2$: A small amount of water was placed in a quartz U-tube and allowed to stand for 30 minutes to saturate the glass surfaces. The excess water was pumped off. Approximately 0.26 mmol of gaseous $PuF_6$ was connected in the U-tube and allowed to react for three hours at room temperature. The $PuF_6$ was completely converted to $PuO_2F_2$, most of which remained in the bottom of the U-tube where the $PuF_6$ was condensed.

About 3.5 mmol of $O_2F_2$ was condensed onto the $PuO_2F_2$ through a 12 in. long stainless steel bellows using liquid nitrogen, and the two compounds allowed to warm to approximately 25° C. After a short reaction period, 15.5 mg of $PuF_6$ (17% of starting material) was recovered. The reaction with $O_2F_2$ was repeated and additional $PuF_6$ (12%) was recovered.

EXAMPLE 3

Reaction of the $O_2F_2$ with $PuF_4$ formed by thermal decomposition of $PuF_6$: About 300 mg of gaseous $PuF_6$ was decomposed in a prefluorinated Monel metal U-tube by heating at 250° C. for 16 hours. Approximately 7 mg of $PuF_6$ remained undecomposed and was removed. The U-tube was then evacuated.

About 5.5 mmol of $O_2F_2$ was condensed into the U-tube and then warmed to approximately 25° C. About 22 mg of $PuF_6$ was recovered (7% yield).

In a second experiment, gaseous $O_2F_2$ was flowed through the U-tube kept at 25 C. for 15 min. An additional 26 mg of $PuF_6$ (8%) was collected.

EXAMPLE 4

Reaction of $PuF_4$ with $O_2F_2$ prepared in situ: 0.33 mmoles of gaseous $PuF_6$ was decomposed in a quartz bulb by uv irradiation. The white product, $PuF_4$, coated the walls of the bulb. After evacuation, $F_2$ and $O_2$ were admitted, the reactor immersed in liquid $N_2$, and uv light admitted. Yellow, red $O_2F_2$ formed on the walls. The excess $F_2$ and $O_2$ was pumped away and the reactor then allowed to warm slowly to room temperature. A measurement of the $F_2$ and $O_2$ pressure after reaction indicated 6.3 mmol of $O_2F_2$ had formed.

The $PuF_6$ was collected at $-78°$ C. and measured. 85% of the original $PuF_6$ was recovered. Very little of the white decomposition product remained in the reaction vessel.

Examples 1–4 demonstrate the feasibility of the utilization of $O_2F_2$ for decontamination of difficult-to-access surfaces from the nonvolatile fluorides and oxyfluorides of plutonium and other actinides. No other known reagent other than F-atoms is capable of $PuF_6$ generation at the low temperatures used here. As mentioned hereinabove, however, F-atom generation for fluorination processes is inefficient.

The low yields observed in Examples 2 and 3 reflect the slower reaction rates which occur when $O_2F_2$ reacts with less reactive solid compounds. That is, $PuO_2F_2$ and highly crystalline $PuF_4$ obtained by thermal decomposition of $PuF_6$, are much less reactive than the finely divided $PuF_4$ resulting from the photochemical decomposition of $PuF_6$. In general, with $O_2F_2$, higher reaction yields can be obtained by lowering the reaction temperature, thereby giving longer contact time with the $O_2F_2$. In Examples 1–4, no attempt was made to optimize the $PuF_6$ yield.

Further, examples 1–4 show that the very reactive $O_2F_2$ is capable of oxidizing $PuF_4$ to $PuF_6$ at low temperatures. Total plutonium removal from contaminated metal surfaces has been repeatedly observed after treatment with $O_2F_2$ gas. It has also been observed that $O_2F_2$ rapidly converts $UF_4$ to $UF_6$, demonstrating thereby applicability of our method to other actinide elements.

A molecular species such as $O_2F_2$ would be expected to survive longer and thereby be more useful in delivering F-atoms to a distant surface to be fluorinated than F-atoms themselves. For example, $O_2F_2$ was shown to survive passage through about 12 in. of stainless steel bellows at ambient temperature.

In summary, the potency of $O_2F_2$ as an oxidative fluorinating agent permits reactions to be run at low temperatures and thus avoids many of the problems of other fluoride volatilization processes contemplated for plutonium recovery. Moreover, despite its short lifetime at ambient temperature, $O_2F_2$ can be delivered effectively to relatively remote locations and thus has important applications for plutonium decontamination. The experiments set forth hereinabove demonstrate that the room temperature or below use of $O_2F_2$ will be highly beneficial for the preparation of pure actinide hexafluorides from their respective tetrafluorides without traces of HF being present as occurs using other fluorinating agents; and decontamination of equipment previously exposed to actinides; e.g., walls, feed lines, etc.

The foregoing description of several preferred embodiments of the invention have been presented for purposes of illustration and description. They are not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A method for the preparation of $PuF_6$ from $PuF_4$, which comprises the steps of:
    a. contacting the $PuF_4$ starting material with $O_2F_2$, thereby generating $PuF_6$; and
    b. collecting said generated $PuF_6$.

2. The method as described in claim 1, wherein said $O_2F_2$ contacting step is conducted at below about 25 C., whereby substantial corrosion of the reactant containing vessel is eliminated.

3. The method as described in claim 2, wherein said $O_2F_2$ contacting step is conducted between about $-80$ and 25 C., whereby substantial corrosion of the reactant containing vessel is eliminated.

4. A method for removal of plutonium and plutonium-containing compounds from plutonium-contaminated articles, which comprises the steps of:
   a. introducing $O_2F_2$ into the region of the articles of interest;
   b. permitting contact with said $O_2F_2$ for a time period such that the plutonium and plutonium-containing compounds are substantially removed from the plutonium-contaminated articles as a result of a chemical reaction with said $O_2F_2$, whereby $PuF_6$ is produced; and
   c. removing said $PuF_6$ from the region of the plutonium-contaminated articles.

5. A method for the preparation of $PuF_6$ from $PuF_4$, which comprises the steps of:
   a. contacting the $PuF_4$ starting material with a fluorinating agent, which consists essentially of $O_2F_2$, thereby generating $PuF_6$; and
   b. collecting said generated $PuF_6$.

6. A method for removal of plutonium and plutonium-containing compounds from plutonium-contaminated articles, which comprises the steps of:
   a. introducing a fluorinating agent, which consists essentially of $O_2F_2$ into the region of the articles of interest;
   b. permitting contact with said $O_2F_2$ for a time period such that the plutonium and plutonium-containing compounds are substantially removed from the plutonium-contaminated articles as a result of a chemical reaction with said $O_2F_2$, whereby $PuF_6$ is produced; and
   c. removing said $PuF_6$ from the region of the plutonium-contaminated articles.

7. A method for the preparation of $PuF_6$ from $PuF_4$, which comprises the steps of:
   a. contacting the $PuF_4$ starting material with flowing $O_2F_2$, thereby generating $PuF_6$; and
   b. collecting said generated $PuF_6$.

8. A method for removal of plutonium and fluorides and oxyfluorides thereof from plutonium-contaminated articles, which comprises the steps of:
   a. flowing $O_2F_2$ into the region of the articles of interest;
   b. permitting contact with said flowing $O_2F_2$ for a time period such that the plutonium and plutonium-containing compounds are substantially removed from the plutonium-contaminated articles as a result of a chemical reaction with said $O_2F_2$, whereby $PuF_6$ is produced; and
   c. removing said $PuF_6$ from the region of the plutonium-contaminated articles.

9. A method for the preparation of actinide hexafluorides from the tetrafluorides thereof, which comprises the steps of:
   a. contacting the actinide tetrafluorides with $O_2F_2$, thereby generating the hexafluorides of the actinides present; and
   b. collecting said generated actinide hexafluorides.

10. A method for removal of actinides and actinide-containing compounds from actinide-contaminated articles, which comprises the steps of:
    a. introducing $O_2F_2$ into the region of the articles of interest;
    b. permitting contact with said $O_2F_2$ for a time period such that the actinides and actinide-containing compounds fluorides and oxyfluorides thereof are substantially removed from the actinide-contaminated articles as a result of a chemical reaction with said $O_2F_2$, whereby actinide hexafluorides are produced; and
    c. removing said actinide hexafluorides from the region of the actinide-contaminated articles.

* * * * *